US010257577B2

(12) United States Patent
Arling et al.

(10) Patent No.: US 10,257,577 B2
(45) Date of Patent: Apr. 9, 2019

(54) SYSTEM AND METHOD FOR SAVING AND RECALLING STATE DATA FOR MEDIA AND HOME APPLIANCES (75) Inventors: Paul D. Arling, Irving, CA (US); Christopher Chambers, Stanton, CA (US); Wayne Scott, Newport Beach, CA (US); Mark Momot, Tustin, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 12/059,596

(22) Filed: Mar. 31, 2008

(65) Prior Publication Data
US 2008/0201753 A1   Aug. 21, 2008

Related U.S. Application Data (62) Division of application No. 10/979,352, filed on Nov. 1, 2004.
(Continued)

(51) Int. Cl.
G06F 3/00 (2006.01)
G06F 13/00 (2006.01)
(Continued)

(52) U.S. Cl.
CPC ..... *H04N 21/47202* (2013.01); *H04L 12/282* (2013.01); *H04L 12/2805* (2013.01);
(Continued)

(58) Field of Classification Search
CPC .......... H04L 12/2805; H04N 21/43615; H04N 21/4131; H04N 21/647; H04N 21/436; H04N 21/85406; H04N 21/42225
(Continued)

(56) References Cited

U.S. PATENT DOCUMENTS 5,101,191 A   3/1992   MacFadyen et al.
5,109,222 A   4/1992   Welty
(Continued)

FOREIGN PATENT DOCUMENTS

EP   1283621 A2   2/2003

OTHER PUBLICATIONS

European Patent Office, examination report issued on European patent application No. 04810231.3, dated Apr. 12, 2017, 6 pages.
(Continued)

*Primary Examiner* — Nasser M Goodarzi
*Assistant Examiner* — Patrick A Ryan
(74) *Attorney, Agent, or Firm* — Greenberg Traurig, LLP (57) ABSTRACT A set of media playback and device settings data from each home appliance of a first set of home appliances is stored on a central server and/or sent to a remote control device upon initiation of a suspend command by a user. The stored media and devices states may be used at a later time to control the first set of home appliances, or a user may, after relocating to a second set of home appliances, initiate a resume state command whereupon media playback and device settings data from the central server and/or remote control device controls each home appliance in the second set of home appliances to bring about the same or substantially similar media and device states as in the first set of home appliances.

8 Claims, 8 Drawing Sheets

Related U.S. Application Data (60) Provisional application No. 60/517,237, filed on Nov. 4, 2003.

(51) Int. Cl.

| | | |
|---|---|---|
| *H04N 5/445* | (2011.01) | |
| *H04N 21/472* | (2011.01) | |
| *H04N 21/41* | (2011.01) | |
| *H04N 21/4405* | (2011.01) | |
| *H04N 21/436* | (2011.01) | |
| *H04N 21/422* | (2011.01) | |
| *H04L 12/28* | (2006.01) | |
| *H04N 21/258* | (2011.01) | |
| *H04N 21/443* | (2011.01) | |
| *H04N 21/6332* | (2011.01) | |
| *H04N 21/81* | (2011.01) | |
| *H04N 21/647* | (2011.01) | |
| *H04N 21/61* | (2011.01) | |
| *H04N 21/6543* | (2011.01) | |
| *H04N 21/854* | (2011.01) | |

(52) U.S. Cl.
CPC . *H04N 21/25858* (2013.01); *H04N 21/25866* (2013.01); *H04N 21/4126* (2013.01); *H04N 21/4131* (2013.01); *H04N 21/42225* (2013.01); *H04N 21/436* (2013.01); *H04N 21/43615* (2013.01); *H04N 21/4405* (2013.01); *H04N 21/4432* (2013.01); *H04N 21/6125* (2013.01); *H04N 21/6332* (2013.01); *H04N 21/647* (2013.01); *H04N 21/6543* (2013.01); *H04N 21/818* (2013.01); *H04N 21/85406* (2013.01)

(58) Field of Classification Search
USPC .................................................. 725/87, 115
See application file for complete search history.

(56) References Cited

U.S. PATENT DOCUMENTS

| | | | |
|---|---|---|---|
| 5,550,576 | A | 8/1996 | Kosterman |
| 5,552,806 | A | 9/1996 | Lenchik |
| 5,642,303 | A | 6/1997 | Small et al. |
| 5,767,919 | A | 6/1998 | Lee et al. |
| 6,166,730 | A | 12/2000 | Goode et al. |
| 6,219,839 | B1 | 4/2001 | Sampsell |
| 6,563,430 | B1 | 5/2003 | Kemink et al. |
| 6,753,790 | B2 | 6/2004 | Davies et al. |
| 6,792,323 | B2 | 9/2004 | Krzyzanowski et al. |
| 7,038,728 | B2 | 5/2006 | Kim et al. |
| 7,237,253 | B1 | 6/2007 | Blackketter et al. |
| 7,243,132 | B2 | 7/2007 | Choi |
| 7,424,677 | B2 * | 9/2008 | Sezan et al. .................. 715/719 |
| 2002/0059621 | A1 * | 5/2002 | Thomas et al. ................. 725/87 |
| 2003/0004934 | A1 | 1/2003 | Qian |
| 2003/0103088 | A1 | 6/2003 | Dresti et al. |
| 2004/0133704 | A1 | 7/2004 | Krzyzanowski et al. |
| 2004/0163073 | A1 | 8/2004 | Krzyzanowski et al. |
| 2005/0035846 | A1 * | 2/2005 | Zigmond et al. ............ 340/5.22 |

OTHER PUBLICATIONS

USPTO, Non-Final Office Action issued on U.S. Appl. No. 13/043,848, dated Jul. 7, 2017, 15 pages.

* cited by examiner

SYSTEM AND METHOD FOR SAVING AND RECALLING STATE DATA FOR MEDIA AND HOME APPLIANCES

RELATED APPLICATION DATA

This application claims the benefit of and is a divisional of U.S. application Ser. No. 10/979,352 which, in turn, claims the benefit of U.S. Provisional Application Ser. No. 60/517,237, filed Nov. 4, 2003, which applications are hereby incorporated by reference in their entirety.

BACKGROUND

The following relates generally to controlling home appliances and, more particularly, relates to a system and method for allowing a user to save, recall, and transfer both media playback and device setting states for one or more sets of home appliances.

The ability to save and recall a series of commands for a particular set of home appliances is well known in the form of macro commands, such as described in U.S. Pat. No. 5,959,751. By way of example, a macro can be used to transmit a sequence of command codes to power on all appliances of a home entertainment center, to access pay-per-view events via a set-top box (STB), etc. Additionally, suspending and resuming a media playback state or device settings state for a particular home appliance is known in the art. For instance, it is customary to pause and play media as well as preset device settings (such as sound equalization, volume, or color balance settings) for individual home appliances in a particular home entertainment center. The use of remote control devices adapted to perform macro commands and remotely suspend and resume media and device states is also well known in the art.

A typical home contains multiple home entertainment centers, each center generally including multiple home appliances which are operable by a user to play the same desired media. For instance, a particular user may have access to home entertainment centers in a living room, home office, and one or more bedrooms of her home, each of which may be capable of playing the same desired media (i.e., television broadcast, video, music, images, etc.) using different appliances in each location. Currently, if the user desires to save a media state (such as the playback state of a movie, song or music playlist, or a particular television show) and associated device settings from one home entertainment center, and later recall, or transfer the saved media and device states to the same, or a different home entertainment center, it would involve significant time and many laborious steps to be performed by the user.

Accordingly, it is desired to provide a system and method that functions to save and recall media and device setting states and which is able to transfer those states from one home entertainment center to another such that the same or substantially similar media playback experience is possible across all available entertainment centers.

SUMMARY

In accordance with these needs and desires, a system and method for saving and recalling state data for media and appliances is hereinafter described. Generally, a user will initiate a save state command for a particular media rendering system from which a movie, music, television broadcast, slide show, image, or other media element is being played. Both the playback state of the media, as well as the rendering system device state(s) during playback, will be saved either in one or more central state servers (such as a control pod, Internet based server, PC, etc., in communication with one or more devices of the media rendering system), sent to a portable controlling device (such as a remote control) to be saved, or as a combination of saved data on a central state server and portable controlling device. Once data has been saved it may be recalled at a later time in its unaltered state to operate the devices and media of the same entertainment center from which it was captured and saved, or it may be recalled and converted (though the operation of devices and programming of the central state server and/or remote control) for use in conjunction with a different media rendering system having analogous or complimentary functionality. In order to ensure that media playback and rendering device state settings transfer correctly to the second media rendering system, a set of device conversion definitions (including current device selection/state data, standard device definitions, and data conversion maps) may be applied to each data element from the first media rendering system (i.e., display settings data, audio settings data, media source settings data, etc.) in order to ensure that data and settings saved from the first rendering system set of device(s) will translate appropriately to the analogous or complimentary device(s) of the second rendering system.

A better understanding of the objects, advantages, features, properties and relationships of the subject system and method will be obtained from the following detailed description and accompanying drawings which set forth illustrative embodiments which are indicative of the various ways in which the principles of the system and method may be employed.

BRIEF DESCRIPTION OF THE DRAWINGS

For a better understanding of the system and method described hereinafter, reference may be had to preferred embodiments shown in the following drawings in which.

DETAILED DESCRIPTION

With reference to the Figures, a system and method is described for use in saving and recalling media and state data for one or more sets of appliances.

Generally, a user will initiate a save state command for a particular media rendering system, such as an exemplary home entertainment center (i.e., set or group of appliances) from which a movie, music, television broadcast, image, or other media element is being played. Any device that can transmit a unique coded signal in IR/RF or other wireless protocol could be used to initiate the process of capturing, storing, transmitting, and resuming the appliance states (i.e., LCD based remote, traditional tactile remote, single button remote, mobile wireless device, etc.) Both the playback state of the media, as well as the device configurations and settings during playback, will be saved either in a central data/state server (such as a media server, control Pod, PC, etc. connected to one or more devices of the home entertainment center), sent to the remote control to be saved, or a combination thereof. Once data has been saved it may be recalled at a later time substantially unaltered to operate the devices and media of the same entertainment center from which it was saved, or it may be recalled (though the operation of devices by the data server and/or remote control) for a different home entertainment center having a set of home appliances of different brand, model, or type which offer analogous services (audio playback/rendering, video playback/rendering, etc.). For example, content being played or rendered on a PVR in one location may be paused, and replayed on a Media Center PC of another location using the system and method of the current invention. In order to ensure that media playback and device state settings transfer correctly to the second home entertainment center device(s), a set of device conversion definitions may be applied to each data element from the first entertainment center (i.e., television settings data, audio receiver settings data, etc.) in order to ensure that data and commands saved from the first device(s) will translate appropriately to the analogous device(s) of the second entertainment center.

The media states able to be saved include, but are not limited to, current cable, satellite, or broadband channel being viewed, PPV or PVR program being viewed, MP3 play list with current track and track offset, Internet based audio or video streams, or any streaming content that can be paused and resumed. The appliance states able to be saved include, are not limited to, input port setting, output format, audio volume level and equalizer settings, display brightness and contrast, ambient lighting, etc. It is envisioned that Internet or other widely accessible network based content may be suspended and resumed from any set of state controllable A/V appliances that have access to Internet/network based content. For example, an Internet based video file could be started from within a home entertainment environment, paused by the user (i.e., via a pause or save state button on a remote control or PDA), and later resumed in a remote hotel room on a different entertainment environment which is controllable by the user (i.e., via the remote or PDA) and which is able to access the Internet based video file. It will be understood that in order to save and recall the playback state (play position) of desired media on one or more entertainment centers, a variety of playback related information may be saved (including track number, chapter, track offset, playing time, seek position, etc.) depending on the capabilities of the playback device for later use. For example, a first CD player may support saving the track number and seek position for a given music CD during a pause command, while a second CD player to which playback is to be resumed supports only track number navigation. In this case the second CD player may resume playback from the start of the saved track, or may be caused to seek an appropriate distance into the track before beginning playback to effect playback of the track at substantially the same position as was saved from the first CD player.

It is also envisioned that when integrated with a home control and automation environment, various location centric "state snapshots" may be saved in a remote control or by a central server for playback at a later time on any set of analogous appliances in the home. For instance, a save room command would capture all current media and appliances state setting for a given room, including lighting states (power and dimmer states), audio playback state (i.e., a given song playing on a given appliance), video playback state (i.e., a given video playing on a given appliance), room thermostat state for temperature settings, etc. Many such similar home, room, environment, or appliance specific states may be saved for subsequent recall and playback, using the same set of appliances or a set of analogous appliances. It will be understood that the extent of saved state data and associated data translation which may be necessary to accomplish a given playback operation depends on the number of particular appliances and media elements involved in a previous save state operation. It should also be understood that the state data saved may include locally-measured items gathered by the controlling device. Such locally measured items may be formatted as data conversion maps to more accurately enable transference of media and device states as described in more detail below. For example, when the controlling device includes a microphone (e.g., is a PDA or a voice activated remote control, etc.) a measurement of the current volume level may be taken and saved. Upon resumption of playback, the media stream may be resumed one or two seconds back from the original pause point in order to allow a comparable volume measurement to be made and the sound level adjusted accordingly. Similarly, a controlling device which includes a light sensor (e.g., an LCD based unit with a sensor for automatic backlight control, an electroluminescent display based unit with automatic brightness control, etc.) may make local measurements of lighting levels in order to duplicate these when playback is resumed. In all cases, such locally measured data may be used as a supplement to, or in place of, inferred or explicit state data, and device conversion definitions collected during the setup and operation of the appliances or equipment in question. The particular methods and techniques for scaling a simple single appliance media and state save and recall operation to support the saving and recalling of multiple appliance and media states will be apparent from the descriptions herein, and well within the routine skill of a programmer skilled in the art.

In the exemplary system, the initiation of save and recall operations by a user are accomplished via a portable controlling device (i.e., activation of a button on a remote control), however it is possible to accomplish the system and method hereof without use of a separate portable controlling device, for instance a STB based button, voice and/or gesture command systems, or a system automation event (i.e., any software automated or event prompted state save command) could be used to initiate save and recall operations for state data without departing from the spirit and scope of the current invention. It will thus be understood that although the exemplary system is described as being operated via a remote control, any controlling devices and/or control systems may be implemented and used in conjunction with the current system and method in order to bring about the desired results.

Similarly, for receipt of save/recall state commands and effecting media states in various control environments, one or more central state servers may be implemented in each appliance, or configured as a separate physical device for communicating with the remote control and appliances. By way of example only, the appliances in the overall control environment for which state data is saved and recalled can include, but are not limited to, televisions, VCRs, DVRs, DVD players, cable converter boxes, amplifiers, CD players, game consoles, home lighting, drapery, fans, HVAC systems, thermostats, personal computers, etc.

Additionally, according to the exemplary system, some or all of the above devices, appliances, or components are configured to be network enabled and interoperable, such as those that are compliant with, for example, the Home Audio Video interoperability ("HAVi"), Universal Plug and Play ("UPnP"), and, generally, other such standards that determine parameter passing and interaction between appliances. In this regard, various standards are being proposed which are intended to provide uniform methods of digital interconnection between appliances. These standards generally specify not only how to transfer audio video source materials, but also how to effect the exchange of control functions between appliances, since it is relatively easy to interleave these different signals on a single interface when they are encoded at the digital level. A more of network enabled appliances (including HAVi and UPnP compliant appliances) and their various functions and features may be found in commonly assigned and co-pending U.S. application "Home Appliance Control System and Methods in a Networked Environment" which claims priority to U.S. provisional application No. 60/517,283.

Figure 2:
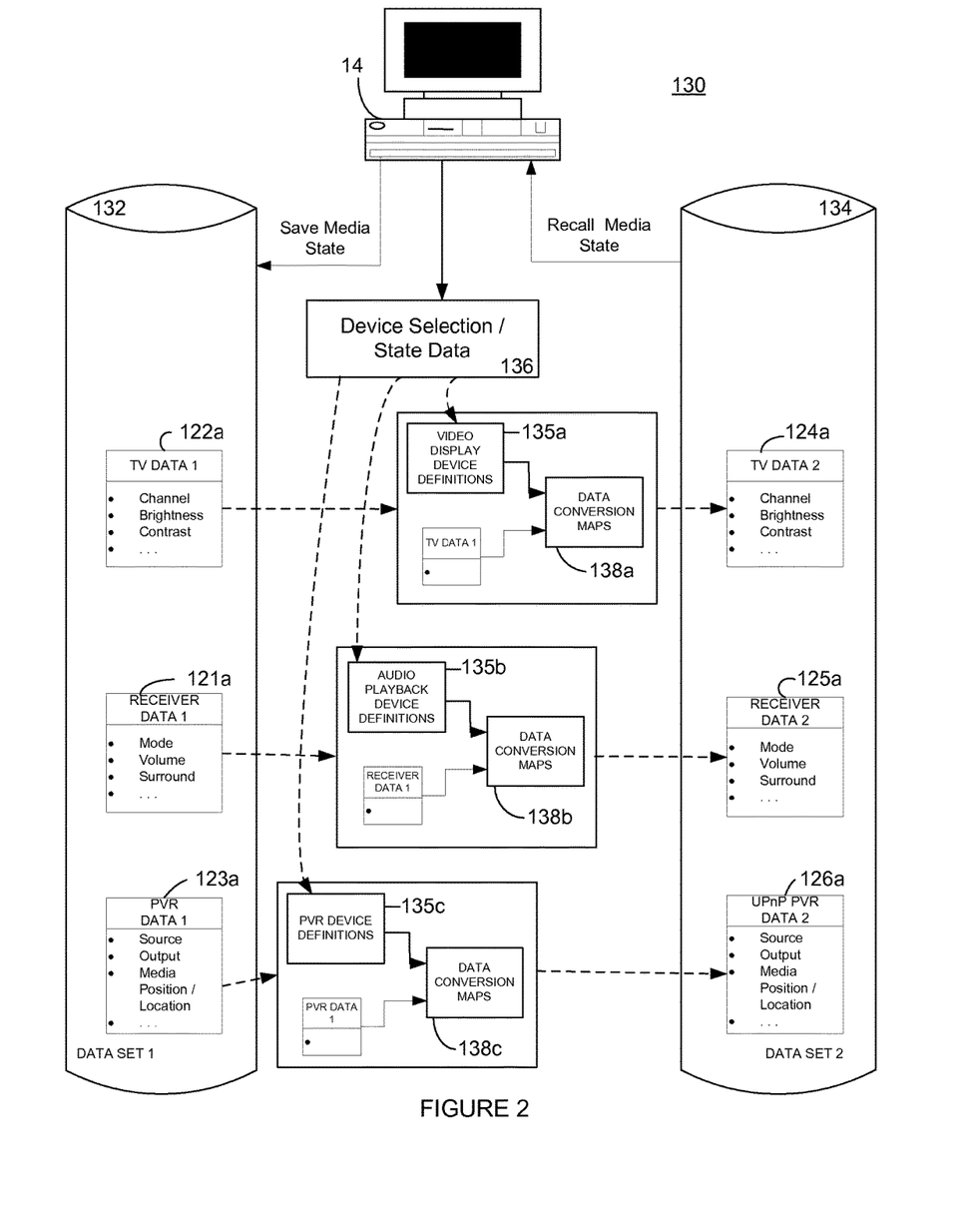
FIG. 2 illustrates the state conversion system of FIG. 1.

For use in transmitting command codes and other state data to one or more of the appliances 12 (which include or are able to communicate with a central state server), the remote control 10 may include, as needed for a particular application, a processor 24 coupled to a memory device (such as ROM memory 26, RAM memory 27, and/or a non-volatile memory 34), a key matrix 28 (e.g., physical buttons, a touch screen display, or a combination thereof), an internal clock and timer 30, transmission circuit(s) 32, receiver circuit(s) 33 and/or transceiver circuit(s) (e.g., IR and/or RF), a means 36 to provide feedback to the user (e.g., LED, display, speaker, and/or the like), and a power supply 38 as generally illustrated in FIG. 2. As previously noted, the remote control 10 may also have means for sensing a level of sound (e.g., a microphone) and/or level of light (e.g., a photo-sensitive element). As will be understood by those of skill in the art, the memory device may include executable instructions that are intended to be executed by the processor 24 to control the operation of the remote control 10. In this manner, the processor 24 may be programmed to control the various electronic components within the remote control 10, e.g., to monitor the power supply 38, to cause the transmission of signals, etc.

The non-volatile read/write memory 34, for example an EEPROM, battery-backed up RAM, Smart Card, memory stick, or the like, may be provided to store setup data, state data, and/or parameters as necessary. While the memory system is described as comprising all three classes of memory, it will be appreciated that, in general, such a memory system need not necessarily support all three, and can be comprised of any type of computer-readable media, such as ROM, RAM, SRAM, FLASH, EEPROM, Smart Card, memory stick, a chip, a hard disk, a magnetic disk, and/or an optical disk or the like in combination. Preferably, however, at least part of the memory system should be non-volatile or battery backed such that basic setup parameters and operating features will survive loss of battery power. Still further, it will be appreciated that some or all of the illustrated memory devices 26, 27, and 34 may be physically incorporated within the same IC chip as the microprocessor 24 (a so called "microcontroller") and, as such, they are shown separately in FIG. 2 only for the sake of clarity. For accomplishing the save and recall operations of the current invention, the memory devices of the remote control may be configured to additionally save room and/or appliance and media state data captured or received from the appliances 12 in response to a save state command.

To identify home appliances by type and make (and sometimes model) such that the remote control device 10 is adapted to transmit recognizable command codes in the format appropriate for such identified appliances 12, data may be entered into the universal remote control device 10. Since methods for setting up a remote control to control the operation of specific home appliances are well-known, such methods need not be described in greater detail herein. Nevertheless, for additional information pertaining to remote control setup, the reader may turn to U.S. Pat. Nos. 4,959,810, 5,614,906, and 6,225,938. It will also be appreciated that the remote control 10 may be set up to control an appliance 12 by being taught the command codes needed to control such appliance as described in U.S. Pat. No. 4,623,887.

To cause the remote control 10 to perform an action, the remote control 10 is adapted to be responsive to events, such as a sensed user interaction with the key matrix 28, receipt of a transmission, etc. In response to an event, appropriate instructions within the memory 26 may be executed. For example, when a command key is activated on the remote control 10, the remote control 10 may retrieve a command code corresponding to the activated command key from memory 26 and transmit the command code to a device in a format recognizable by the device. It will be appreciated that the instructions within the memory 26 can be used not only to cause the transmission of command codes and/or data to the appliances 12 but also to perform local operations, e.g., modifying command and state data for transmission to appliances other than the appliances from which the original command and state data was captured, as described in greater detail below. While not limiting, other local operations that may be performed by the remote control 10 include displaying information/data, favorite channel setup, macro button setup, function key relocation, remote location sensing, etc. Examples of local operations can be found in U.S. Pat. Nos. 5,481,256, 5,959,751, and 6,014,092. Additional examples of remote controls 10 may be found in commonly owned, U.S. Pat. No. 6,225,938 and U.S. application Ser. Nos. 60/264,767, 09/905,423, 09/905,432, and 09/905,396.

Figure 3:
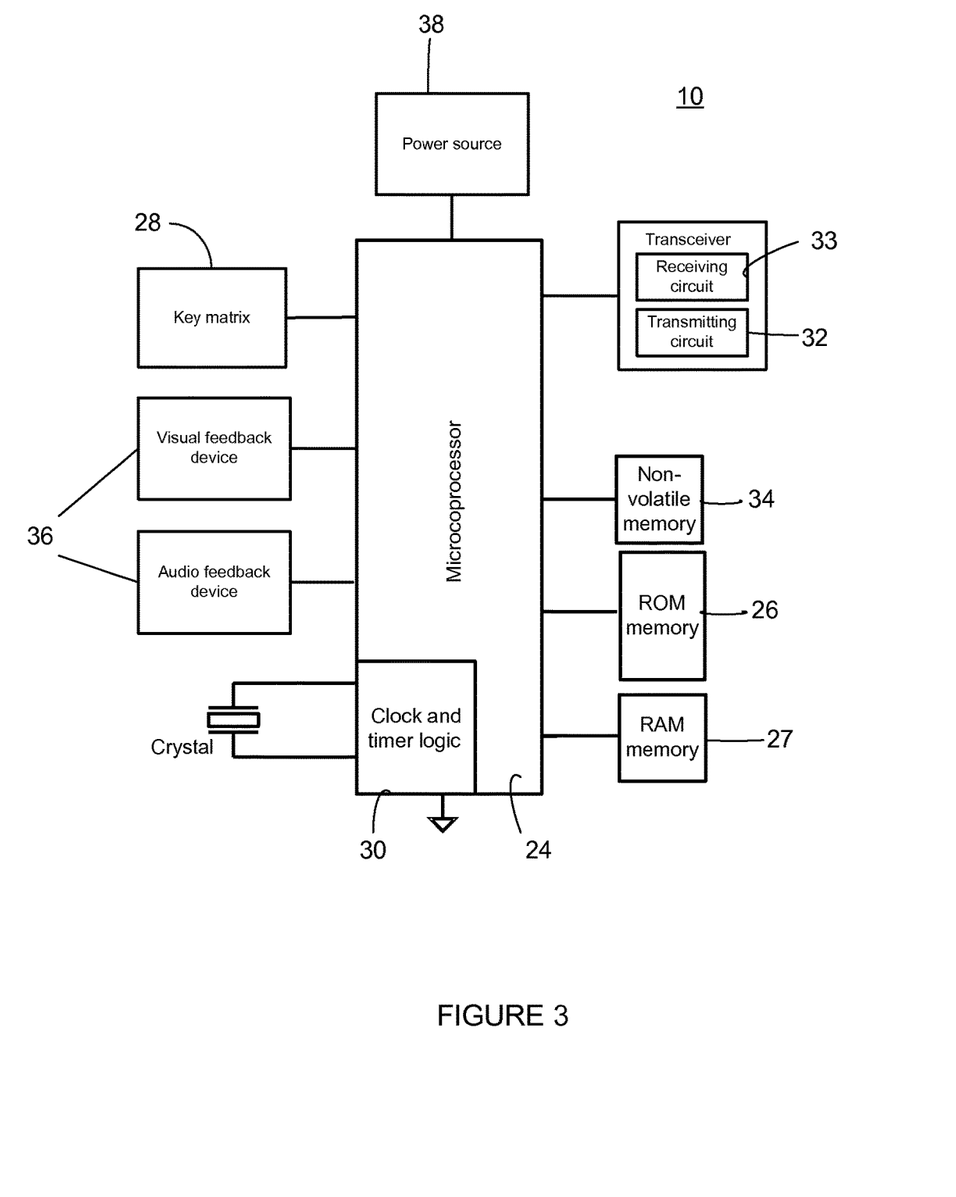
FIG. 3 illustrates a block diagram of components of an exemplary remote control.
Figure 4:
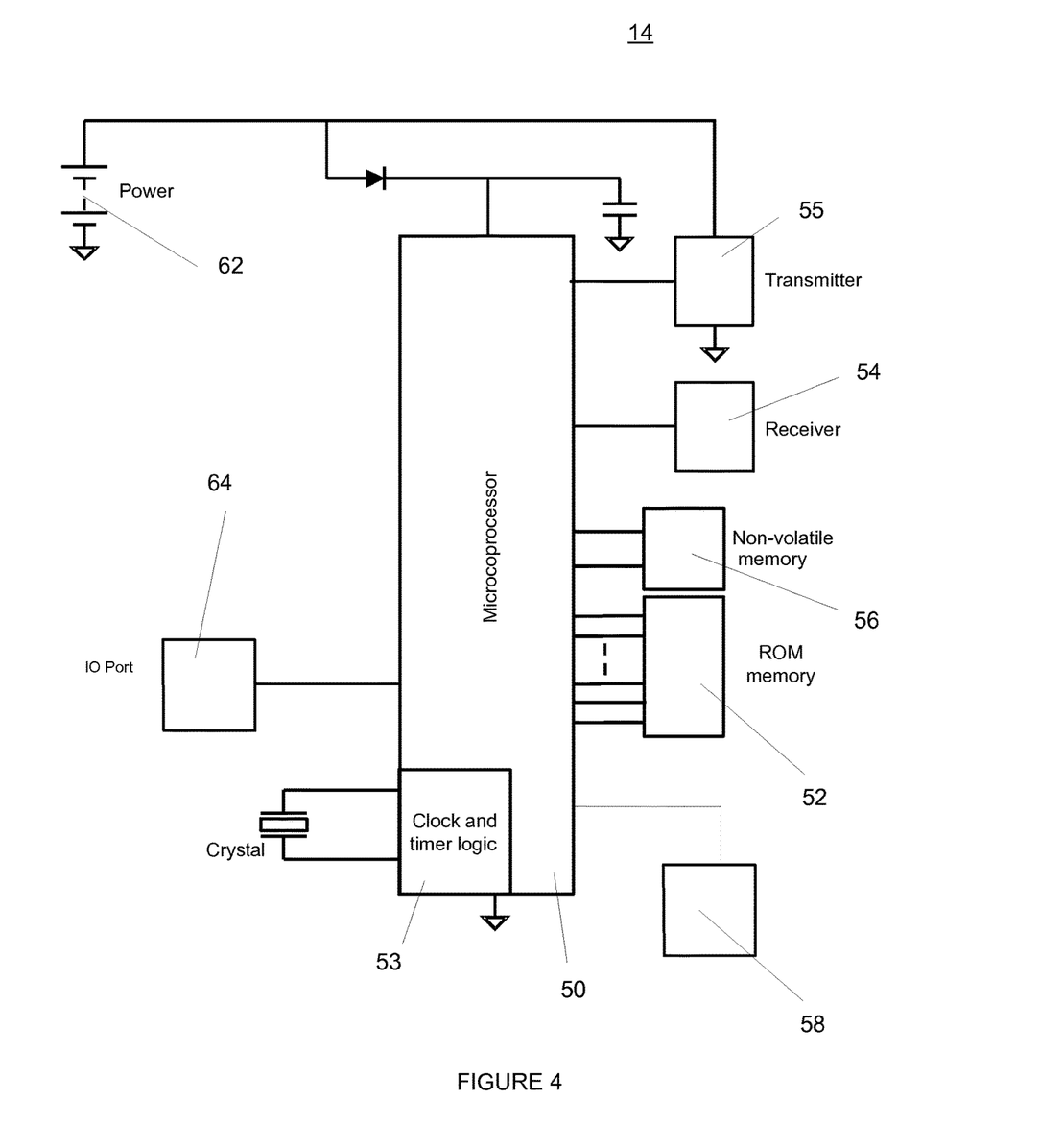
FIG. 4 illustrates a block diagram of components of an exemplary central state server.

For use in facilitating the save and recall operations between the remote control 10 and one or more appliances 12 (or sets of appliances 12a and 12b), one exemplary system and method includes one or more central state servers 14. The central state server(s) 14 may be a device separate and apart from the appliances 12 or may be integrated into one or more of the appliances as a functional component. Central state server 14 may additionally be integrated with other extended function control devices such as the command receiver described in commonly assigned co-pending U.S. patent application Ser. No. 10/603,839 entitled "System And Method For Monitoring Remote Control Transmissions," or state monitor described in commonly assigned co-pending U.S. patent application Ser. No. 10/665,650 entitled "System And Method For Monitoring Remote Control Transmissions" which applications are incorporated herein by reference in their entirety. In either case, the central state server 14 may include, as needed for a particular application, a processor 50 coupled to a ROM memory 52, an internal clock and timer 53, receiver circuit(s) 54, transmission circuit(s) 55 and/or transceiver circuit(s) (e.g., IR and/or RF), a non-volatile read/write memory 56, a means 58 to provide feedback to the user (e.g., LED, display, speaker, and/or the like), a power supply 62, and input means 64, (e.g., serial I/O port, Ethernet, 1394 firewire, wireless receiver, bar code scanner, etc.), as is generally illustrated in FIG. 3. As previously noted, the central state server 14 may also have means for sensing a level of sound (e.g., a microphone) and/or level of light (e.g., a photo-sensitive element). The input means 64 may be used to connect each central state server 14 to a common home control unit (such as a server, HVAC controller, etc.) in order to enable communication and timing operations between all central state servers, media servers, and/or appliances. The ROM memory 52 includes executable instructions that are intended to be executed by the processor 50 to control the operation of the central state server 14. In this manner, the processor 50 may be programmed to control the various electronic components within the central state server 14, e.g., to monitor the power supply 62, to cause the transmission of signals, to provide audio or visual prompts to a user, etc. The non-volatile read/write memory 56, for example an EEPROM, battery-backed up RAM, Smart Card, memory stick, or the like, is provided to store state data, setup data and/or parameters as necessary. While the memory 52 is illustrated and described as a ROM memory, memory 52 can also be comprised of any type of readable media, such as ROM, RAM, SRAM, FLASH, EEPROM, or the like. Preferably, at least part of the memory 56 is non-volatile or battery-backed such that data is not required to be reloaded after power is removed from central state server 14. In addition, the memories 52 and 56 may take the form of a chip, a hard disk, a magnetic disk, and/or an optical disk. It will also be appreciated that in cases where central state server capability is integrated into an appliance, some or all of the functional elements described above in conjunction with FIG. 4 may be combined with similar elements already present in the appliance for other purposes.

Figure 1:
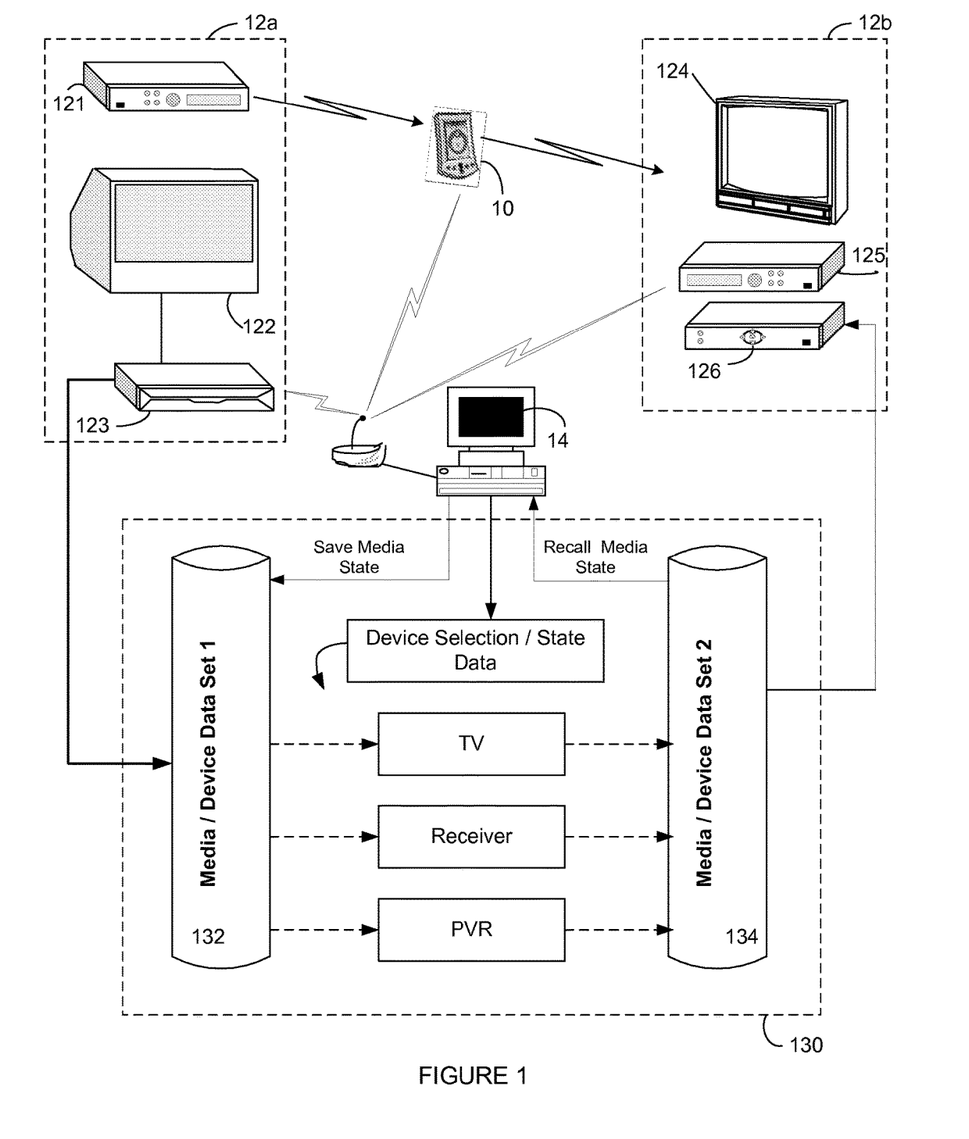
FIG. 1 illustrates an exemplary system employing a method for saving and recalling media and device state settings.

For transmitting and receiving information between remote control 10, appliances 12, and/or the central state server 14 (as shown in FIG. 1), communication may be performed using an IR protocol such as XMP (described in co-pending U.S. patent application Ser. No. 10/431,930) an RF protocol such as Bluetooth or 802.11, X-10 commands, SCP, IP, UPnP, HAVi, or any other suitable wireless and/or wired transmission methods. All that is required to enable the system and method of the current invention is that the remote control 10, appliances 12, and central state server 14 be able to communicate device and media states between one another. It will be appreciated that due to the wide variety of communication methods and protocols that may be required to adequately communicate device and media states to and from home appliances, the ability of the remote control and/or central state server to dynamically transmit and receive a greater number of protocols will enable compatibility for save and recall operations with a greater number of home appliances. For example, remote control 10 may first send a save state request via XMP over RF to central state server 14, which in turn sends an appropriate communication signal to each appliance of entertainment center 12*a* to determine all available devices and media states associated with the appliances. When attempting to transfer the saved state data to a new set of appliances 12*b*, remote control 10 may be required to communicate using several different IR protocols to individual appliances (e.g., RC-6, SIRCS, Kaseikyo, etc.) in addition to initiating a media playback state via RF to central state server 14. It will additionally be appreciated that programming on the remote control and/or or central state server may be used for making determinations as to which communication methods and protocols may be used for a given set of appliances to most effectively bring about desired device and media save and recall operations, as described in greater detail below.

In keeping with the subject system and method, the remote control 10 and/or central state server 14 preferably include programming such that the captured appliance and media state data may be stored in one or more memory locations, used to generate command data which is assigned or linked to a command button on the remote control, and recalled at such time and in such a manner as necessary to bring about a desired user action. The state data elements and definitions of the current system are illustrated in FIGS. 1 and 2 as functional block 130 in central state server 14, however it will be appreciated that the actual state data elements, device conversion definitions, and other data storage and processing elements may be configured (and/or distributed) on any device, appliance, or component of the system, including appliances 12, remote control 10, and/or any software program or elements on any device. Generally data set 132 is composed of state and media data captured from a set of source appliances and media 12*a* (the particular media in the exemplary system being played back from PVR 123). In the exemplary system source appliances 12*a* comprise TV 122, receiver 121, and networked appliance 123 (e.g., a PVR, UPnP media renderer, connected DVD player, etc.). As such corresponding data elements for source appliances 12*a* that may be saved for subsequent command generation, conversion and/or playback include TV related data 122*a* (e.g., channel, brightness, contrast, etc.), receiver data 121*a* (e.g., mode, volume, surround state, etc.), and networked appliance data 123*a* (e.g., media source, output, media playback position, etc.). The data elements 121*a*, 122*a*, and 123*a* may be saved in any known format, for example as an XML file (e.g., as contemplated by the UPnP specification), or spreadsheet/database entries on central state server 14, such that further operations as described below may be performed on the data. Once saved in the central state server 14 (or on remote control 10 and/or any other appliance 12), data set 132 may be used to generate command data (i.e., IR or RF based appliance commands) which may then be assigned as a macro command or other immediately available command set on remote control 10 for use by a user in effecting recall of the device and media states on source appliance set 12*a*. It will thus be appreciated that in general, little or no further processing of a saved data sets and associated commands generated for use by a remote control may be necessary when recalling device and media states for the same set of source appliances.

For effecting recall of saved device and media states on a different set of destination appliances 12*b* (characterized in that appliances 12*b* may correspond to appliances 12*a* in type, but may differ in make and/or model and features), a further state conversion system and process may be used. As shown in FIG. 2, the general device conversion definitions includes device selection/state data 136 (which may comprise current device state data, current room data, current remote location data, or user specific data), device definitions 135 (which may comprise available device command and function abilities for individual appliances), and data conversion maps 138 (which may comprises preset rules and logic governing data conversion operations). In general, the device selection/state data 136, device definitions 135, and data conversion maps 138 are used in converting or modifying data set 132 to data set 134. In the exemplary system, device selection/state data may include remote location data, for example, based on a user selected location button on the remote control 10 or via application of the system and method described in commonly assigned and co-pending U.S. application entitled "System and Method for Controlling Device Location Determination" which claims priority to U.S. provisional application No. 60/517,588). A determination that remote control 10 is present in a different location than source appliances 12*a* (e.g., data indicative of a location change is present on remote control 10 or central state server 14) may trigger the process of converting data set 132 to data set 134 for application to a different set of destination appliances 12*b*. Additionally, the actual location data (i.e., device selection data 136) may be used by processors 50 and/or 24 in each device state data conversion process.

By way of example only, video display device definitions 135*a* may include (among other data) information about the available command and function states for TV's 122 and 124, audio playback device definitions 135*b* may include (among other data) information about the available command and function states for receivers 121 and 125, and PVR device definitions 135*c* may include (among other data) information about the available command and function states for PVRs 123 and 126. After data set 132 (including TV state data 122*a*, receiver state data 121*a*, and PVR state data 123*a*) has been saved using the save state process (described in greater detail below), location data corresponding to appliance set 12*b* may be received which triggers application of the device conversion definitions. TV state data 122*a* comprising input selection, brightness, and contrast state data may be applied with video display device definitions 135*a* corresponding to TV 124 to generate new TV state data 124*a* (which may include, or may be used to generate specific command data for TV 124). Additionally, data conversion maps 138*a* may be used prior to generation of TV state data 124*a* such that more accurate reproductions of device states (i.e., what the user experiences during media playback from TV 122 versus playback of the same media from TV 124) may be possible. For example, a brightness state of "4" out of a possible 10 different brightness states for TV 122 may have been saved as part of TV state data 122*a* during a save operation. During conversion to TV state data 124*a*, video display device definitions 135*a* may include information indicating TV 124 also includes controllable brightness settings, however strict application of the brightness setting "4" to the TV state data 124*a* for generating commands to operate TV 124 may not produce the same visual effect as a brightness setting of "4" on TV 122. As such, preset, or dynamically generated data conversion maps (i.e., based on information from an ambient light sensor in the room or on the remote control, or stored information as to the relative lumen output levels of both TV's) may be used to further adjust or conform TV state data 124*a* such that the state effected during a recall state operation for TV 124 produces substantially the same user experience as saved from TV 122.

Similarly, receiver state data 121*a* comprising mode, volume, and surround state data may be applied with audio playback device definitions 135*b* corresponding to receiver 125 to generate new receiver state data 125*a* (which may include, or may be used to generate specific command data for receiver 125). Data conversion maps 138*b* may be used prior to generation of receiver state data 125*a* such that more accurate reproductions of device states (i.e., what the user experiences during media playback from receiver 125 versus playback of the same media from receiver 121) may be possible. For example, a volume state of "4" out of a possible 10 different volume states for receiver 121 may have been saved as part of receiver state data 121*a* during a save operation. During conversion to receiver state data 125*a*, audio playback device definitions 135*b* may include information indicating receiver 125 also includes controllable volume settings, however strict application of the volume setting "4" to the receiver state data 125*a* for generating commands to operate receiver 125 may not produce the same auditory effect as a volume setting of "4" on receiver 121. As such, preset, or dynamically generated data conversion maps (i.e., based on information from an microphone in the room or on the remote control, or stored information as to the relative decibel output levels of both receivers) may be used to further adjust or conform receiver state data 125*a* such that the state effected during a recall state operation for receiver 125 produces substantially the same user experience as saved from receiver 121.

Likewise, PVR state data 123*a* comprising source, output, and media position state data may be applied with PVR device definitions 135*c* corresponding to PVR 126 to generate new PVR state data 126*a* (which may include, or may be used to generate specific command data for PVR 126). Data conversion maps 138*c* may be used prior to generation of PVR state data 126*a* such that more accurate reproductions of device states (i.e., what the user experiences during media playback from PVR 126 versus playback of the same media from PVR 123) may be possible. For example, an output media format of ".mpg" for PVR 123 may have been saved as part of PVR state data 123*a* during a save operation. During conversion to PVR state data 126*a*, PVR device definitions 135*c* may include information indicating PVR 126 does not include support for .mpg format media files, and thus streaming or transferring the desired media file to the PVR 126 (via PVR state data 126*a* for generating commands to operate PVR 126) will not cause playback of the desired media. As such, preset, or dynamically generated data conversion maps (i.e., media format converters or alternate sources to search for or access the same media file in an acceptable format) may be used to further adjust or conform PVR state data 126*a* such that the state effected during a recall state operation for PVR 126 produces a comparable user experience to that saved from PVR 123 by applying substantially the same device and media states to PVR 126 and its associated rendering devices 124,125. In this context though, it will be appreciated that interdependencies may exist between devices which may need to be accounted for through the state conversion mapping process, so achievement of "comparable" device and media states should be understood to include such adaptations or compromises as may be necessary to match the capabilities of the target equipment.

By way of further example, PVR 123 may be playing back anamorphically compressed video material suitable for presentation on a 16:9 aspect ratio widescreen display monitor 122. If the television 124 to which this video data is to be redirected on resumption of playback has a 4:3 aspect ratio display, this should be identified so that the video playback may be resumed in "letterbox" format (i.e., compressed vertically in the same degree as the horizontal anamorphic compression). In the case where resumption of playback is implemented by transferring the video data itself from PVR 123 to PVR 126, this may be inherently accounted for in the default output settings of PVR 126 as a result of it's association with 4:3 television 124. However in the more general case where the resumed video data may be streamed directly from PVR 123 to TV 124 (via, e.g., an IEEE 1394 or 802.11 network) this adjustment should be effected at the data source, i.e., PVR 123. By way of still further example, a/v receiver 121 may be capable of processing a DTS-encoded digital sound stream, while a/v receiver 125 may only be capable of processing Dolby Digital or Pro-Logic input. In this case, resumption of playback on system 12b will also necessitate adjustment of the audio output stream associated with the video data from PVR 123.

Looking now to FIGS. 5-8, exemplary methods for saving and recalling device and media states are shown and described. It will be appreciated the following methods and steps may be performed via user interaction with the system, programming on the remote control, programming on the central state server, or as a combination of operations performed by a user, the remote, or a central server. As such the exemplary methods should not be taken as limiting as many various modifications, including the order in which steps are recited as occurring, are possible without departing from the teachings of the current invention.

Figure 5:
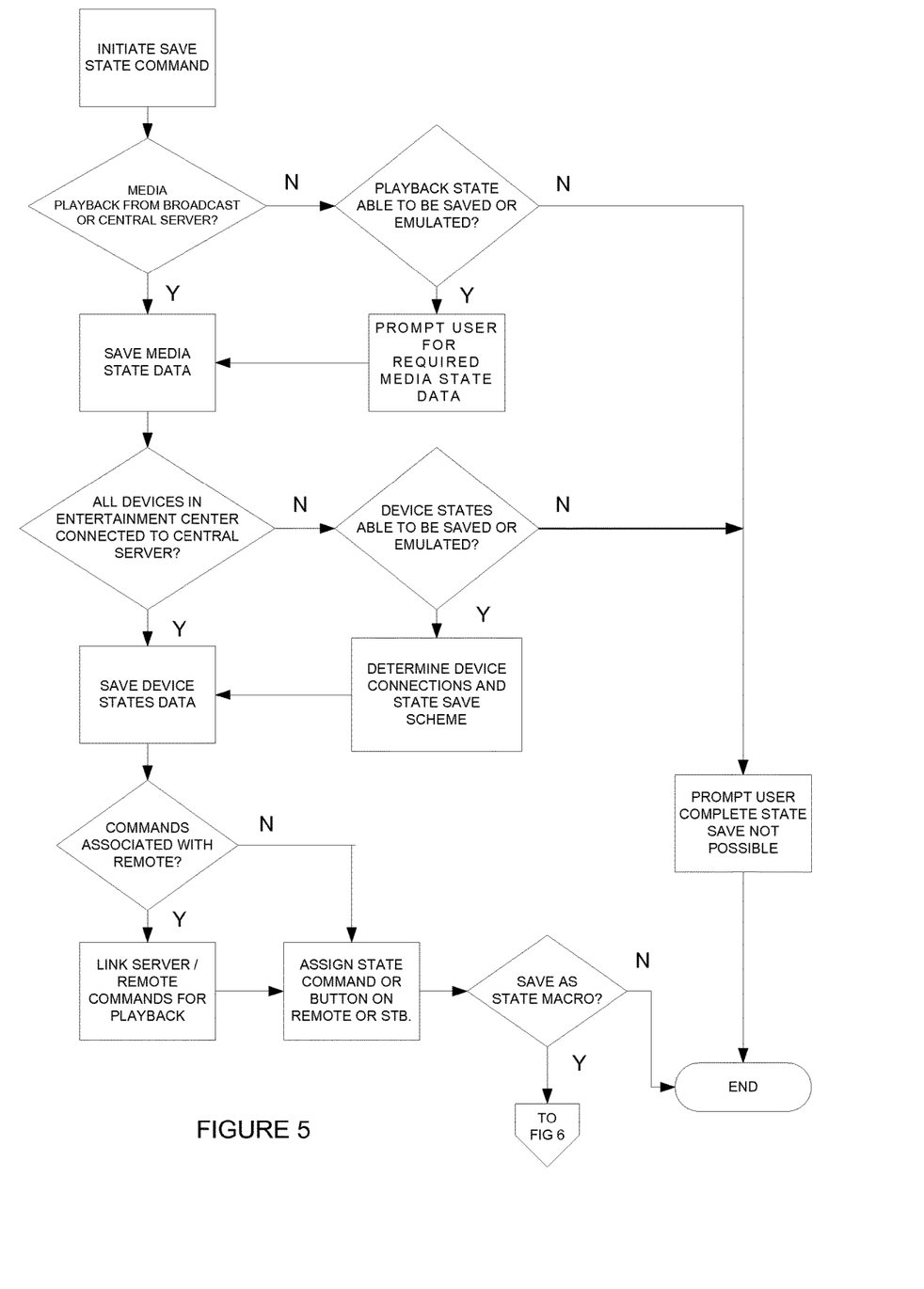
FIG. 5 illustrates a flow chart diagram of exemplary steps for use in saving state commands.
Figure 6:
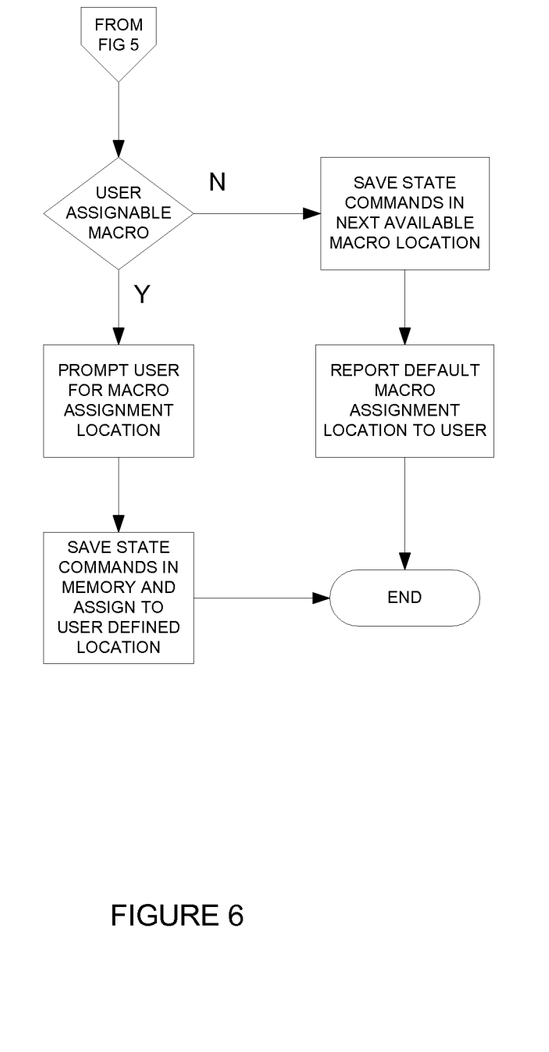
FIG. 6 is a continuation of the flow chart diagram of FIG. 5.

Initially, a save state command is issued to a given set of appliances (typically those within a defined control environment such as a room or entertainment center which is current engaged in user control or media playback) via any of the above described methods (user interaction with a remote control, or STB button, voice based commands, gesture based commands, etc.). Programming on the remote control, central state server, or the appliances themselves may query the state and type of media currently being played to determine if a recallable state may be saved without additional user input. If additional user input is needed for the system to accurately and adequately save the media state for later recall and playback, programming may prompt the user to input necessary media state data. The system may then determine if all devices for which a save state command is requested are connected to the central state server, or are controllable only via the remote control (or other controlling device). If all device states are able to easily be saved to the central state server by virtue of their connection to the server or one another (as is contemplated by UPnP, HAVi, and/or other home interoperability standards) then all necessary data may be present on the central state server for appropriately controlling the appliances in a recall operation, or converting the data for use with a new set of appliances. As may often be the case, not all appliances in a particular entertainment center will be connected to a central state server such that state and command data may be easily and conveniently saved simply by virtue of such connections. In those cases, the system may include programming to determine if all device states can be saved or emulated (i.e., some states may not be able to be saved directly per se, but may be effected via operation of a preexisting or dynamically generated macro command to the appliance) for later playback. A further determination of device connections, and the particular communication methods and protocols that may be necessary to save in order to effect a later recall operation may also be made. If the system determines that not all state data known to be necessary in effecting a later recall operation may be saved, the user may be prompted that a complete state save operation will not be possible. Once all necessary state data, including media states, appliance interconnection data, and various command protocol data elements have been saved, the system may include programming to associate certain states of commands with the remote control, or central server as necessary to effect later recall operations. For instance, during a save state operation it may be determined that one or more commands captured via the central control server must be sent to the particular appliance via an IR based command during a recall operation. As such, that particular data or command elements may be sent to, or linked with the remote control such that when a recall operation is initiated, the command is issued appropriately (e.g., via IR transmission and the appropriate protocol) to bring about the desired result. The saved state and/or command data may then be assigned or linked to a particular remote control, state server, or other controlling device that is most appropriate to bring about the desired result during later recall operations. The system may also provide the saved state and/or command data for availability as a user assignable macro such that playback of the saved state may easily be effected via a desired remote control button or macro location.

Figure 7:
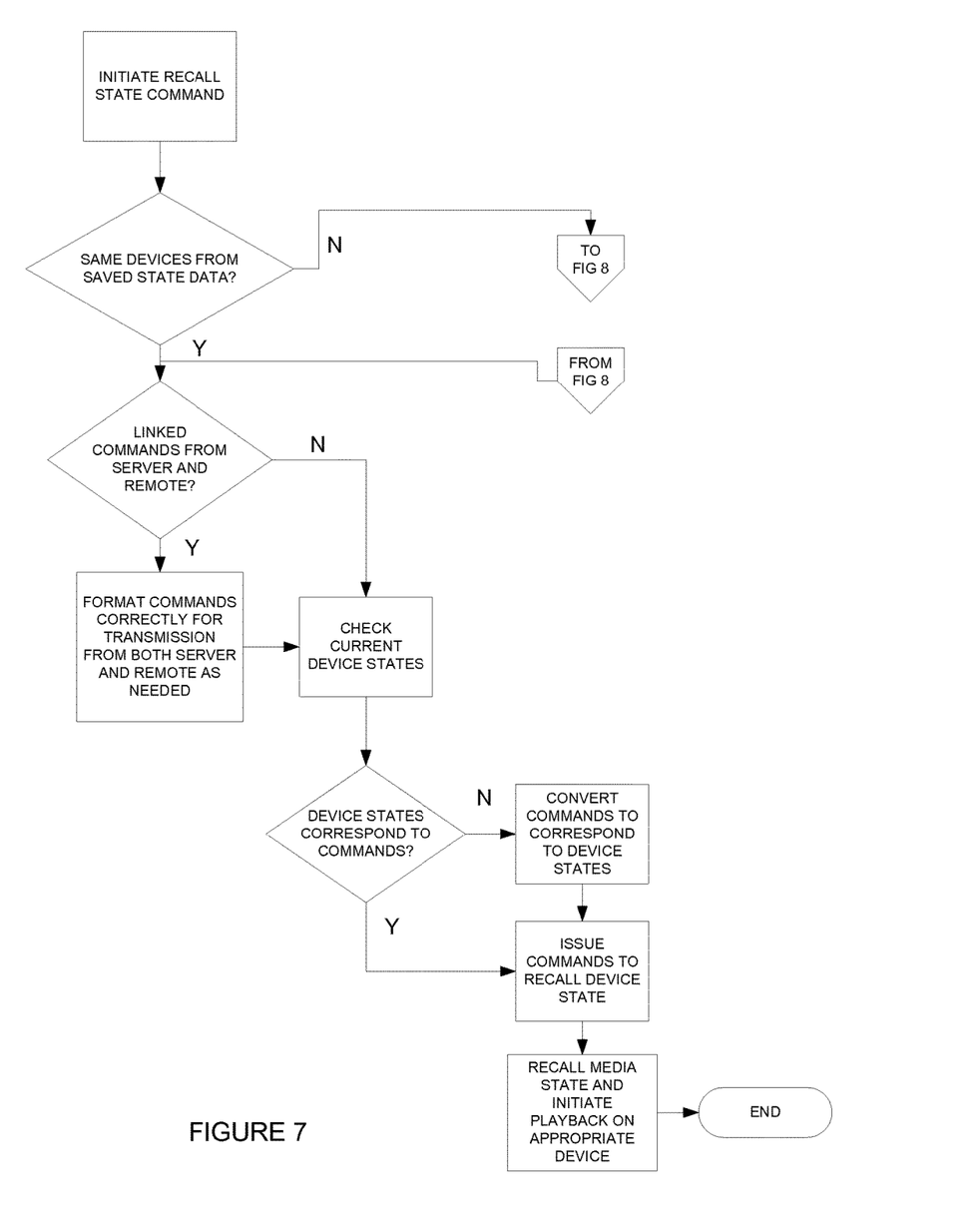
FIG. 7 illustrates a flow chart diagram of exemplary steps for use in recalling and converting saved state commands.
Figure 8:
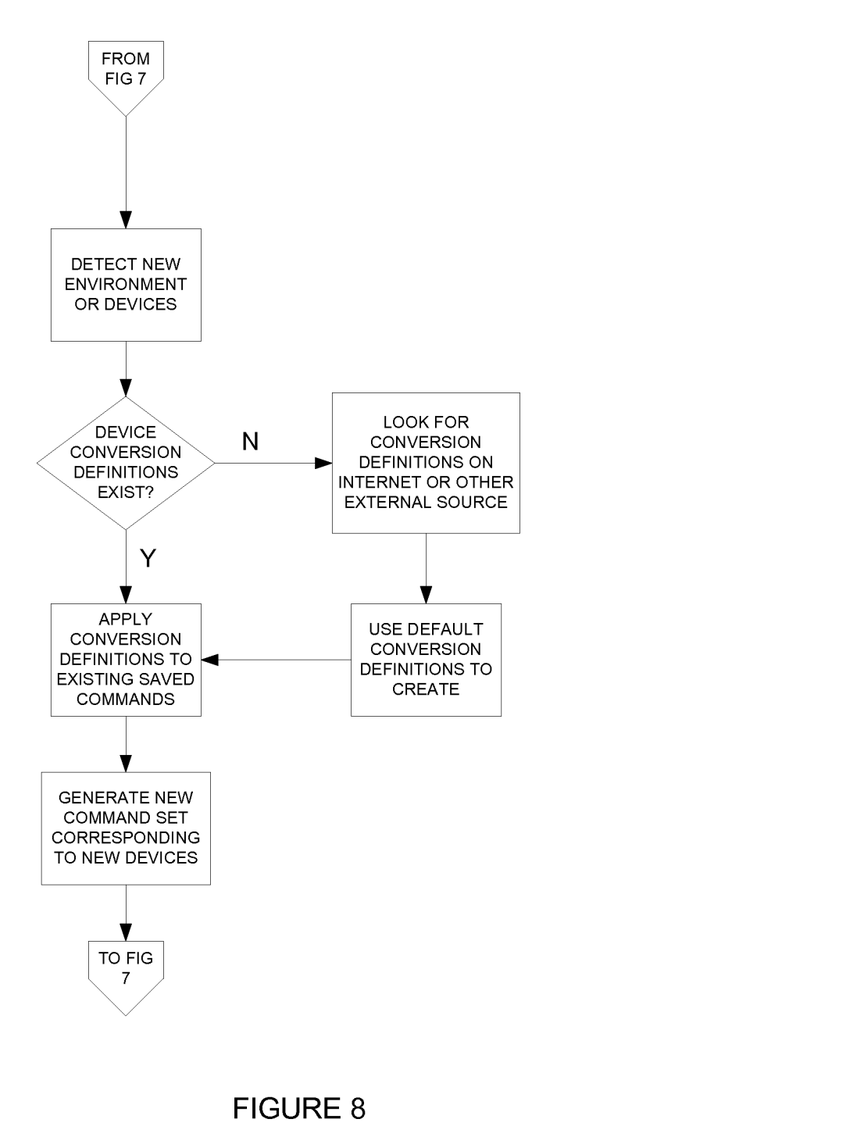
FIG. 8 is a continuation of the flow chart diagram of FIG. 7.

The recall state command may be issued to a given set of appliances (typically those within a defined control environment such as a room or entertainment center which is currently engaged in user control or media playback) via any of the above described methods (e.g., user interaction with a remote control, or STB button, voice based commands, gesture based commands, etc.). If a determination is made by the system that the recall operation is to apply to the same set of appliances as state data was originally captured from, the saved state/command data may be formatted and transmitted to the appropriate appliances without significant conversion operations. Specifically, commands for individual appliances may be formatted correctly for transmission from either or both of the remote control and central state server, including checking the current states of applicable appliances for any command modifications which may be necessary to bringing about the desired media and device state. Conversely, a determination may be made that the saved state data is to be applied to a different set of appliances than the appliances from which the state data was originally saved. In this case, the new location data, including data relating to the new appliances that are to receive and recall the saved state commands is used in a conversion operation. As described above, various device definitions, current device selection/state data, and data conversion maps may be used to perform logical operations on the originally saved state data in order to present a set of new state and command data for the new appliances to be controlled. Once the new data sets have been generated, the state data and commands may be formatted correctly for transmission from either or both of the remote control and central state server, including checking the current states of applicable appliances for any command modifications which may be necessary to bring about the desired media and device state.

It will be appreciated that for certain save and recall operations, for example pause and resume operations for live broadcast or similar media, one aspect of the save state operation may involve initiation of a media recording function (as is common on many PVR devices such as Tivo or Replay TV devices) such that the media may be later resumed at exactly the same spot at which it was saved. As such, the ability to resume the playback of such saved media will be available on the same set of appliances from which it was saved, or from a different set of appliances assuming the second set of appliances have access to the saved media.

As will also be appreciated, the means for performing conversion operations (including the application of preset or dynamically generated rules and/or system logic) on the saved media and state data may comprise machine-readable instructions loaded in the memory of one or more system devices, appliances, or servers (for instance, the remote control, or the hard drive or other non-volatile memory in the case of a media center PC, central state server, or similar computing based home control device). The machine-readable instructions are capable of performing pre-programmed logic processing on the incoming and saved state data and command code set(s), such that effective recall operations (including conversion processes for different sets of appliances) may be performed with minimal user interaction. The software (machine-readable instructions) code to implement such a system is well within the routine skill of a programmer, but may include for instance, reference to device state and function tables, a comparative database of command codes and appliance types, frequently used or desirable appliance states and command code sets, determination of a particular command code scheme (such as a particular type of IR command encoding scheme), etc.

In another alternate embodiment of the present invention, the control environment is connected to a network (such as a LAN, WAN, or the Internet) such that it may receive close range command codes (such as via an IR or RF base remote control) and/or long range command codes (such as from a remote user sending command codes from a portable phone, wireless enabled PDA, via the Internet, etc.), in each case one or more of the devices, appliances, or servers of the control environment being able to initiate the saving and recalling of media and device states based on remotely transmitted command codes. By way of example, a remote user listening to a media broadcast in his car may initiate a pause state command (for instance representing commands to pause the current location of the media broadcast) from a user interface on a wireless enabled PDA or mobile phone via the Internet to the home control device. The command may cause the desired home appliances to be activated for immediate recording of the media broadcast, and volume levels, surround sounds settings and the like from the user's car stereo may be saved either on the PDA or on the home control device. The device settings, including the media itself may then be later recalled for playback at the users home. In cases where the car audio receiver includes media recording capabilities (e.g., PVR based functions), the initial pause state command may cause some or all of the media broadcast to be saved locally on the car receiver for later transfer to the users home entertainment system. Because a user may not leave his car running once he has returned home, and to conserve power consumption by the car system in general, a command may be sent from the car (either by the user or automatically by the car's control system by virtue of the car's wireless communication and syncing capabilities with the home network in conjunction with location determination capabilities as described above) upon returning home in order to initiate recording of the program by the home entertainment system. As such, portions of the saved media obtained from both the car receiver/recorder system and the home based audio receiver (also with recording capabilities) may be combined for later replay as a single media file. Traditional syncing methods may be used for obtaining and combining the media files, either by the car or the home control system, as specified by a user preference or setting. Thus, both device and media states, and saved media itself may distributed among various devices and appliances of a networked environment (including a wirelessly networked environment via the Internet) yet still be available for immediate recall and playback on any of a users appliances and devices. In the any of the above scenarios and embodiments, the remote control, one or more appliances and/or the server may serve to relay desired state data and command codes directly to various desired appliances to effectuate the desired functionality, or may relay one or more signals to a secondary signal relay/generation device (such as an IR repeater, RF wireless access point, etc.) to effectuate the desired appliance functionality.

In still another alternate embodiment of the present invention, a save state command or routine is used in conjunction with traditional macro programming methods to enable additional features and functions in a home control environment. With the onset of digital based entertainment appliances, especially those which make use of one or more interoperability protocols (e.g., UPnP, HAVI, etc), many device settings may be accessed and controlled absolutely (e.g., Volume=27 or Brightness=75) rather than using traditionally ramp or slider functions. Additionally, as described above, a remote control (or other controlling device) having two-way communication capabilities with the appliances may both save and recall these absolute/discrete entertainment appliance settings to enable enhanced functionality. For example, when programming favorite channels on the remote, the user can optionally save additional associated settings, such as absolute volume, tone, color, brightness, etc., settings for that channel. The data for these additional associated settings could be input manually by the user, or automatically based on the current state of such associated settings on the particular entertainment appliances(s). The state data for associated settings could also be provided dynamically based on information contained in a particular media program or file. For example a user could program different settings for the same channel based on activity, e.g., watching a movie vs. watching a football game vs. listening to the news. Where the channel change process is initiated via selection of a guide listing, or any method by which metadata about the program or media file may be obtained, different settings could also be selected based on the genre, category, rating, or other information from the guide data and/or other metadata source. These above described additional associated settings (including dynamically generated settings based on metadata) could be defined as specific to an individual macro command, or could be globally set for a particular channel, program, appliance, etc. In the latter case, they would be invoked no matter how one accessed the channel, program, or appliance (e.g., by a favorite icon button on a remote control, TV guide link, manual channel changing on appliance, etc.). As described above, the state data for all settings can be saved either locally on the remote control, on a central server accessible to the remote control, and/or other appliances in the control environment. Where the channel change process is initiated via selection of a guide listing, or other methods which may not involve interaction with the remote control, the appliance which received a command may query the remote control or central state server to determine if additional associated settings were specified in order to initiate the requested command and all associated state changes. It will be understood and appreciated that saving and recalling of associated state data with macro commands, channel changes, etc. may be applied broadly to most any event initiated in a control environment, and is not limited in application in certain appliances or control events.

The system and process of the present invention has been described above in terms of functional modules in block diagram format. It is understood that unless otherwise stated to the contrary herein, one or more functions and features may be integrated in a single physical device or a software module in a software product, or one or more functions may be implemented in separate physical devices or software modules, without departing from the scope and spirit of the present invention. For instance, it will be understood and appreciated by those skilled in the art that the remote control 10 of the present invention may be any portable control device (including but not limited to IR and/or RF based remotes, portable phones, wireless capable PDAs, etc.) capable of transmitting and/or receiving state data and command codes remotely to and from the appliances 12 or central state server 14 and, as such, the term "remote control" is to also encompass all such devices. Likewise, the central state server 14 of the present invention may be any home control device (including but not limited to STB's, media center PC's, home automation systems, etc) capable of receiving signals representing state date and/or command codes from the appliances and portable control device, performing conversion operations on saves state and command data, and effectuating state changes in one or more appliances (either directly, or through further operation and interaction with the portable control device or other control devices) and, as such, the term "central state server" is to also encompass all such devices.

It is appreciated that detailed discussion of the actual implementation of each module is not necessary for an enabling understanding of the invention. The actual implementation is well within the routine skill of a programmer and system engineer, given the disclosure herein of the system attributes, functionality, and inter-relationship of the various functional modules in the system. A person skilled in the art, applying ordinary skill can practice the present invention without undue experimentation.

While various concepts have been described in detail, it will be appreciated by those skilled in the art that various modifications and alternatives to those concepts could be developed in light of the overall teachings of the disclosure. As such, the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for using a controlling device to place a plurality of appliances in a home entertainment system into a selected state as a function of a media content, comprising:
   receiving at the controlling device a command to cause a one of the plurality of appliances to tune to a channel which provides the media content;
   obtaining metadata associated with the media content that is being provided by the channel at the time that the command is received, wherein the obtained metadata associated with the media content contains data indicative of at least one of content genre, content rating, and content category;
   selecting from a plurality of states for the home entertainment system that have each been associated with the channel a one of the plurality of states for the home entertainment system that has been associated with the obtained metadata; and
   causing the controlling device to transmit a sequence of commands that causes each of the plurality of appliances to be placed into a state that corresponds to the selected one of the plurality of states for the home entertainment system.

2. The method as recited in claim 1, comprising causing the controlling device to dynamically generate the sequence of commands to be transmitted from the controlling device.

3. The method as recited in claim 1, wherein the sequence of commands to be transmitted from the controlling device is predetermined and pre-associated with the data indicative of at least one of content genre, content rating, and content category contained within the obtained metadata associated with the media content.

4. The method as recited in claim 3, comprising causing the sequence of commands to be downloaded to the controlling device from a device remote to the controlling device wherein the sequence of commands is downloaded to the controlling device in response to the device remote to the controlling device receiving the obtained metadata associated with the content.

5. The method as recited in claim 1, wherein metadata associated with the content is obtained in response to a one of the plurality of appliances accessing the content.

6. The method as recited in claim 5, comprising using the controlling device to command the one of the plurality of appliances to tune to the channel which provides the media content.

7. The method as recited in claim 5, comprising using a displayed guide listing to cause the controlling device to receive the command to cause a one of the plurality of appliances to tune to a channel which provides the media content.

8. The method as recited in claim 1, wherein the controlling device is a component part of the one of the plurality of appliance that is to be tuned to the channel which provides the media content.

\* \* \* \* \*